(12) United States Patent
Moriguchi et al.

(10) Patent No.: US 12,734,841 B2
(45) Date of Patent: Sep. 15, 2026

(54) PRINTING METHOD AND PRINTING APPARATUS

(71) Applicant: CANON KABUSHIKI KAISHA, Tokyo (JP)

(72) Inventors: Takuto Moriguchi, Kanagawa (JP); Tsukasa Sano, Kanagawa (JP); Osamu Yoshitake, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 18/636,414

(22) Filed: Apr. 16, 2024

(65) Prior Publication Data

US 2024/0359499 A1 Oct. 31, 2024

(30) Foreign Application Priority Data

Apr. 28, 2023 (JP) ................................ 2023-074324

(51) Int. Cl.

| | |
|---|---|
| ***B41M 7/00*** | (2006.01) |
| ***B41J 11/00*** | (2006.01) |
| ***B41M 3/00*** | (2006.01) |
| ***C09D 11/037*** | (2014.01) |
| ***C09D 11/324*** | (2014.01) |
| ***C09D 11/54*** | (2014.01) |

(52) U.S. Cl.

CPC .......... *B41M 7/009* (2013.01); *B41J 11/0022* (2021.01); *B41M 3/001* (2013.01); *B41M 3/008* (2013.01); *C09D 11/037* (2013.01); *C09D 11/324* (2013.01); *C09D 11/54* (2013.01)

(58) Field of Classification Search

CPC ...... B41M 7/009; B41M 3/001; B41M 3/008; B41J 11/0022; B41J 11/00222; C09D 11/037; C09D 11/324; C09D 11/54

See application file for complete search history.

(56) References Cited

U.S. PATENT DOCUMENTS

| | | | |
|---|---|---|---|
| 9,527,314 | B2 | 12/2016 | Moriguchi et al. |
| 10,029,481 | B2 | 7/2018 | Ohnishi et al. |
| 10,377,150 | B2 | 8/2019 | Ohnishi et al. |

FOREIGN PATENT DOCUMENTS

| | | | | |
|---|---|---|---|---|
| CN | 105082757 A | * 11/2015 | | B41J 29/38 |
| JP | 2017-52176 A | 3/2017 | | |

OTHER PUBLICATIONS

Kanai, Masafumi, "Printing Device And Printing Method" (CN 105082757 A), Nov. 25, 2015, [Description] (Year: 2015).*

Moriguchi et al., U.S. Appl. No. 18/582,856, filed Feb. 1, 2024.

* cited by examiner

*Primary Examiner* — Lisa Solomon

(74) *Attorney, Agent, or Firm* — Venable LLP

(57) ABSTRACT

A printing method capable of appropriately drying a printing medium is provided. The printing method includes an ink application step and a drying step of drying a printing medium to which ink has been applied at the ink application step. In a case where a printing medium is a first type, at the drying step, the printing medium is dried by using a first drying method so that the water content of the printing medium is included within a predetermined range. In a case where a printing medium is a second type whose tendency to contain water is stronger than that of the first type, at the drying step, the printing medium is dried by using a second drying method whose drying effect is higher than that of the first drying method so that the water content of the printing medium is included within the predetermined range.

16 Claims, 5 Drawing Sheets

[Table 1]

| | Paper Type | Basis Weight (gsm) | Airflow Volume ($m^3$/min) | Warm Air Temperature (°C) | Undersurface Heating Temperature(°C) | Water Content (%) | Scratch Resistance Evaluation | Cockling Evaluation |
|---|---|---|---|---|---|---|---|---|
| Exemplary embodiment 1 | coated paper 1 | 84.9 | 200 | 80 | 80 | 6 | A | A |
| Exemplary embodiment 2 | coated paper 2 | 209.4 | 50 | 80 | 80 | 6 | A | A |
| Exemplary embodiment 3 | coated paper 1 | 84.9 | 100 | 80 | 100 | 4 | B | A |
| Exemplary embodiment 4 | coated paper 2 | 209.4 | 100 | 80 | 60 | 8 | A | B |
| Exemplary embodiment 5 | non-coated paper 1 | 84.9 | 200 | 80 | 80 | 8 | A | B |
| Exemplary embodiment 6 | non-coated paper 2 | 209.4 | 50 | 80 | 80 | 8 | A | B |
| Exemplary embodiment 7 | non-coated paper 1 | 84.9 | 100 | 80 | 100 | 6 | A | A |
| Exemplary embodiment 8 | non-coated paper 2 | 209.4 | 100 | 80 | 80 | 8 | A | B |
| Comparative embodiment 1 | coated paper 1 | 84.9 | 50 | 80 | 80 | 12 | A | C |
| Comparative embodiment 2 | coated paper 2 | 209.4 | 200 | 80 | 80 | 1 | C | A |
| Comparative embodiment 3 | coated paper 1 | 84.9 | 100 | 80 | 60 | 13 | A | C |
| Comparative embodiment 4 | coated paper 2 | 209.4 | 100 | 80 | 120 | 1 | C | A |
| Comparative embodiment 5 | non-coated paper 1 | 84.9 | 50 | 80 | 80 | 13 | A | C |
| Comparative embodiment 6 | non-coated paper 2 | 209.4 | 200 | 80 | 80 | 3 | B | B |
| Comparative embodiment 7 | non-coated paper 1 | 84.9 | 100 | 80 | 60 | 14 | A | C |
| Comparative embodiment 8 | non-coated paper 2 | 209.4 | 100 | 80 | 120 | 3 | B | B |

FIG.5

PRINTING METHOD AND PRINTING APPARATUS

BACKGROUND

Field of the Invention

The present invention relates to a printing method and a printing apparatus.

Description of the Related Art

For the printing method in which printing is performed by forming an image by appending ink to a printing medium, it is desired to obtain fastness of an image by causing a solvent included in ink to permeate into the printing medium irrespective of the ink absorption capacity of the printing medium.

In the situation such as this, Japanese Patent Laid-Open No. 2017-52176 has disclosed an ejection apparatus (also called printing apparatus) causing ink droplets to permeate into a printing medium by causing the printing medium onto which ink droplets are ejected to pass through a space in a high-humidity environment.

However, in the ejection apparatus of Japanese Patent Laid-Open No. 2017-52176, before the printing medium is dried, the printing medium passes through the high-humidity space whose humidity is increased compared to that around the apparatus. Because of this, in a case where the basis weight of the printing medium is comparatively small, the printing medium excessively absorbs water in ink, and therefore, there is a possibility that cockling occurs. In addition to this, in the ejection apparatus of Japanese Patent Laid-Open No. 2017-52176, the heating temperature in a case where the printing medium is dried is comparatively low. Because of this, in a case where the basis weight of the printing medium is comparatively large, the heat capacity of the printing medium becomes high in accordance with the size of basis weight, and therefore, it is difficult to completely dry the printing medium.

SUMMARY

Consequently, an object of the present invention is to provide a printing method capable of appropriately drying a printing medium.

The printing method according to the present invention is a printing method including an ink application step of applying ink to a printing medium; and a drying step of drying a printing medium to which ink has been applied at the ink application step, wherein in a case where a printing medium is a first type, at the drying step, the printing medium is dried by using a first drying method so that the water content of the printing medium is included within a predetermined range and in a case where a printing medium is a second type whose tendency to contain water is stronger than that of the first type, at the drying step, the printing medium is dried by using a second drying method whose drying effect is higher than that of the first drying method so that the water content of the printing medium is included within the predetermined range.

Further features of the present invention will become apparent from the following description of exemplary embodiments with reference to the attached drawings.

BRIEF DESCRIPTION OF THE DRAWINGS

FIG. 5 is a diagram showing types and thermophysical property values of materials used for the surface of a fixing member that comes into contact with a printing medium.

DESCRIPTION OF THE EMBODIMENTS

First Embodiment

Hereinafter, with reference to the attached drawings, the present invention is explained in detail in accordance with preferred embodiments. Configurations shown in the following embodiments are merely exemplary and the present invention is not limited to the configurations shown schematically.

Figure 1:
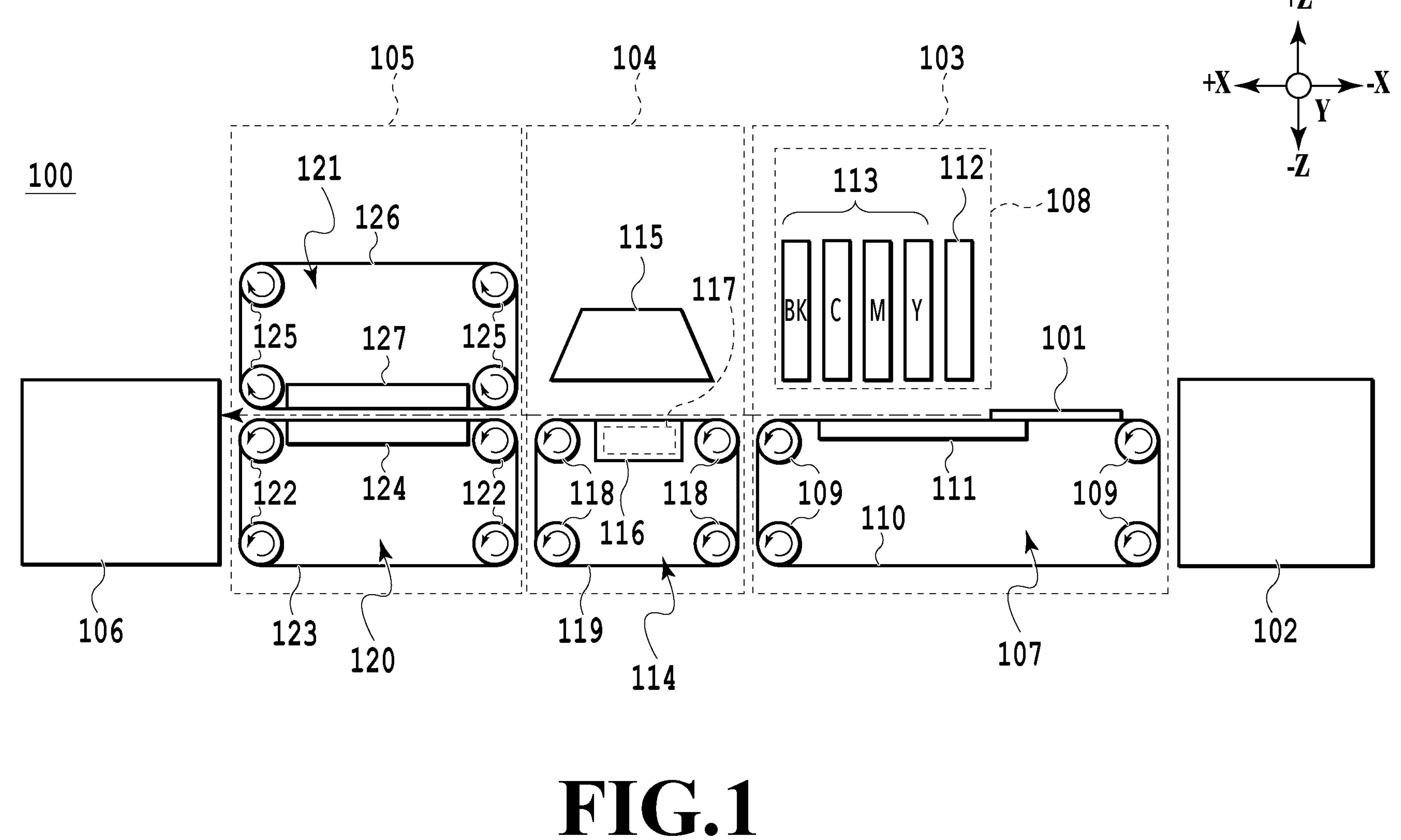
FIG. 1 is a schematic diagram showing a configuration example of a printing apparatus in one embodiment.

FIG. 1 is a schematic diagram showing one example of an outlie configuration of a printing apparatus 100.

In FIG. 1, three arrows perpendicular to one another are shown, that is, an arrow X, an arrow Y, and an arrow Z. In the present embodiment, each of an X-direction, a Y-direction, and a Z-direction indicates the width direction (full-length direction), the depth direction, and the height direction of the printing apparatus 100, respectively. In the X-direction, a +X-direction indicates the conveyance direction of a printing medium 101. A −X-direction indicates the opposite direction of the +X-direction. In the Z-direction, a +Z-direction indicates the upward direction. A −Z-direction indicates the downward direction. Further, the surface of the printing medium 101, which faces in the +Z-direction is called "top surface" and the surface facing in the −Z-direction is called "undersurface".

In FIG. 1, an arrow shown inside of a first rotation axis 109, a second rotation axis 118, a third rotation axis 122, and a fourth rotation axis 125 indicates the rotation direction of each rotation axis. An arrow indicated by a one-dot chain line indicates the conveyance path of the printing medium 101.

<Printing Medium 101>

In the present embodiment, the printing medium 101 is not limited particularly as long as it is possible for the printing medium 101 to receive a reaction liquid and ink. As the printing medium 101, it is possible to use a publicly known printing medium. As one example of the printing medium 101, there are a long sheet wound into the shape of a roll, or a flat sheet cut into predetermined dimensions. As examples of the material of the printing medium 101, there are paper, plastic film, wooden board, corrugated cardboard, metallic film and the like. As one example of paper, there is coated paper onto the printing medium surface of which chemicals, such as white pigment, are applied with a glue material, such as starch and latex, or non-coated paper onto the printing medium surface of which nothing is applied. Of the coated paper and the non-coated paper, the coated paper is preferable to the non-coated paper. The reason is that the speed at which ink permeates into paper is slower in the coated paper than in the non-coated paper.

<Printing Apparatus 100>

As shown in FIG. 1, the printing apparatus 100 comprises a sheet feeding unit 102 capable of feeding the printing medium 101, an image formation unit 103 capable of forming an image, a drying unit 104 capable of drying the printing medium 101, a fixing unit 105 capable of fixing an image, and a discharge unit 106 capable of discharging the printing medium 101.

<Sheet Feeding Unit 102>

The sheet feeding unit 102 is configured so as to be capable of feeding the printing medium 101 to the image formation unit 103.

<Image Formation Unit 103>

The image formation unit 103 comprises a first conveyance mechanism 107 capable of conveying the printing medium 101 to the drying unit 104 and an image formation mechanism 108 capable of forming an image on the printing medium 101.

<First Conveyance Mechanism 107>

The first conveyance mechanism 107 is installed so as to extend in the Y-direction and comprises the four first rotation axes 109 arranged in the X-direction and a first belt 110 wound so as to be capable of rotating accompanying the rotation of the rotation axis. In the example shown in FIG. 1, the first rotation axis 109 rotates counterclockwise and causes the first belt 110 to rotate counterclockwise. Due to this, the printing medium 101 is conveyed in the +X-direction. As one example of the material included in the first belt 110, there is resin, metal or the like. In the first belt 110, a large number of holes is bored. Further, the first conveyance mechanism 107 comprises a first fixing mechanism 111 arranged under the printing medium 101 on the first belt 110 and capable of fixing the printing medium 101 on the first belt 110.

As one example of the first fixing mechanism 111, there is a suction pump capable of generating a negative pressure. By actuating the suction pump, it is possible to fix the printing medium 101 while sucking the printing medium 101 on the first belt 110 through the holes bored in the first belt 110.

<Image Formation Mechanism 108>

The image formation mechanism 108 comprises a reaction liquid application mechanism 112 capable of applying a reaction liquid to the printing medium 101, which reacts with ink, and an ink application mechanism 113 capable of applying ink to the printing medium 101.

<Reaction Liquid Application Mechanism 112>

The reaction liquid application mechanism 112 is configured so as to be capable of applying a reaction liquid to the printing medium 101. The reaction liquid application mechanism 112 may be any mechanism as long as it is possible for the reaction liquid application mechanism 112 to apply a reaction liquid to the printing medium 101. As the reaction liquid application mechanism 112, it is possible to appropriately use various mechanisms known conventionally. As a specific example of the reaction liquid application mechanism 112, there is a gravure offset roller, an ink jet head, a dye coating device (dye coater), a blade coating device (blade coater) or the like.

The application of a reaction liquid by the reaction liquid application mechanism 112 may be performed before the application of ink or after the application of ink by the ink application mechanism 113 as long as it is possible for the reaction liquid to mix (react) with ink on the printing medium 101. However, it is preferable to apply a reaction liquid before applying ink. The reason is that it is possible to suppress bleeding and beading by applying a reaction liquid before the application of ink.

Bleeding means that the boundary between images becomes obscure because the adjacent different types of applied ink mix with each other in a case where an image is formed by the ink jet method. Beading means that the shading is recognized visually within a uniform image because the ink applied earlier is pulled to the ink applied later in a case where an image is formed by the ink jet method.

<Reaction Liquid>

It is possible for the reaction liquid used in the present embodiment to reduce the fluidity of the ink and/or part of the ink composition on the printing medium 101 by coming into contact with the ink. Specifically, a reactant (component that increases the viscosity of ink) included in the reaction liquid chemically reacts with or physically absorbs the color material, the resin or the like, which is part of the composition configuring the ink, by coming into contact therewith. Due to this, the viscosity of the whole ink is increased, or the viscosity is increased locally due to the cohesion of part of the component configuring the ink, such as the color material. By increasing the viscosity, it is possible to reduce the fluidity of the ink and/or part of the ink composition. By reducing the fluidity, it is possible to suppress bleeding and beading.

In the following, each component configuring the reaction liquid applied to the present embodiment is explained in detail.

<Reactant>

The reaction liquid contains a reactant and causes the component (resin, self-dispersible pigment and the like) having an anionic group in ink to cohere by coming into contact with the ink. As an example of the reactant, there is a polyvalent metal ion, cationic component, such as a cationic resin, an organic acid or the like. As one example of the polyvalent metal ion, there is a divalent metal ion, such as $Ca^{2+}$, $Cu^{2+}$, $Ni^{2+}$, $Mg^{2+}$, $Sr^{2+}$, $Ba^{2+}$, and $Zn^{2+}$. As another example of the polyvalent metal ion, there is a trivalent metal ion, such as $Fe^{3+}$, $Cr^{3+}$, $Y^{3+}$, and $Al^{3+}$.

In order to cause the reaction liquid to contain a polyvalent metal ion, it is possible to use a polyvalent metal salt (hydrate may also be used) configured by a polyvalent metal ion and an anion coupling with each other. As one example of anion, there is an inorganic anion, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$, and $H_2PO_4^-$. As another example of anion, there is an organic anion, such as $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, and $CH_3SO_3^-$. In a case where a polyvalent metal ion is used as a reactant, it is preferable for the content (mass %) in terms of polyvalent metal salt in the reaction liquid to be 1.00 mass % to 20.00 mass % with the total mass of the reaction liquid taken as a reference.

The reaction liquid containing an organic acid turns the anionic group of the component existing in ink into the acid type and causes cohesion by having the buffer capacity in the acidic area (less than pH 7.0, preferably, pH 2.0 to pH 5.0). As one example of the organic acid, there are a monocarboxylic acid, such as formic acid, acetic acid, propionic acid, butyric acid, benzoic acid, glycolic acid, lactic acid, salicylic acid, pyrrole carboxylic acid, furancarboxylic acid, picolinic acid, nicotinic acid, thiophene carboxylic acid, levulinic acid, and coumalic acid, and a salt thereof. As another example of the organic acid, there are a dicarboxylic acid, such as oxalic acid, malonic acid, succinic acid, glutaric acid, adipic acid, maleic acid, fumaric acid, itaconic acid, sebacic acid, phthalic acid, malic acid, and tartaric acid, and a salt and a hydrogen salt thereof. Further, as another example of the organic acid, there are a tricarboxylic acid, such as citric acid and trimellitic acid, and a salt and a hydrogen salt thereof. In addition to those described above, as another example of the organic acid, there are a tetracarboxylic acid, such as pyromellitic acid, and a salt and a hydrogen salt thereof. It is preferable for the content (mass %) of the organic acid in the reaction liquid to be 1.00 mass % to 50.00 mass %.

As one example of the cation resin, there is a resin having the structure of primary to tertiary amines, a resin having the structure of a quaternary ammonium salt or the like. As a specific example of the cation resin, there is a resin and the like having the structure of vinylamine, allylamine, vinyl imidazole, vinyl pyridine, dimethylamino ethylmethacrylate, ethyleneimine, guanidine and the like. It is also possible to use both the cation resin and the acid compound at the same time, or perform processing to turn the cation resin into a quaternary resin in order to increase solubility in the reaction liquid. In a case where the cation resin is used as a reactant, it is preferable for the content (mass %) of the cation resin in the reaction liquid to be 1.00 mass % to 10.00 mass % with the total mass of the reaction liquid taken as a reference.

<Component Other than Reactant>

As the component other than the reactant, it is possible to use the aqueous medium, which is described as can be used for ink, or the same component as that of other additives and the like.

<Ink Application Mechanism 113>

On the printing medium 101, the reaction liquid and the ink are mixed with each other and an image is formed by the reaction liquid and the ink. In the present embodiment, as the ink application mechanism 113, an ink jet head is used. As one example of an aspect of the ink jet head, there is an aspect in which ink is ejected by causing film boiling to occur in the ink by an electrothermal transducer to form air bubbles, an aspect in which ink is ejected by an electromechanical transducer, an aspect in which ink is ejected by utilizing static electricity or the like.

From the point of view of performing fast and high-density printing, it is preferred to use, among others, an ink jet head utilizing an electrothermal transducer. Drawing by the ink jet head is performed by applying the necessary amount of ink to each position upon receipt of an image signal. The ink jet head of the present embodiment is a full-line head installed so as to extend in the Y-direction. Nozzles are arrayed in the range capable of covering the width (length in the Y-direction) of the image formation area of the printing medium 101 having the maximum size that can be used. The ink jet head has an ink ejection surface in the undersurface (surface facing in the −Z-direction) of which nozzles are opened. The ink ejection surface faces the surface (surface facing in the +Z-direction) of the printing medium 101 with a small gap about millimeters in size in between.

It is possible to represent the ink application amount by using the density value of image data, the ink thickness and the like. In the present embodiment, the average value is taken as the ink application amount (g/m$^2$), which is obtained by multiplying the mass of each ink dot by the number of dots to be applied and by dividing the product by the area of the area in which ink is applied. The maximum ink application amount in the image formation area means the ink application amount applied in the area of at least 5 mm$^2$ or more within the area, which is used as information on the medium onto which ink is ejected from the point of view of removing the liquid component in the ink.

As shown in FIG. 1, it may also be possible for the ink application mechanism 113 to comprise a plurality of ink jet heads in order to apply a plurality of types of ink to the printing medium 101. For example, in a case where each color image is formed by using yellow ink, magenta ink, cyan ink, and black ink, the ink application mechanism 113 comprises four ink jet heads each ejecting one of the above-described four color inks onto the printing medium 101. These ink jet heads are arranged so as to be situated side by side in the X-direction. In the example shown in FIG. 1, along the +X-direction, the ink jet heads are arranged in order of yellow (Y), magenta (M), cyan (C), and black (BK).

<Ink>

In the following, each component configuring the ink to be applied to the present embodiment is explained in detail.

<Color Material>

As a color material, it is possible to use pigment and dye. It is preferable for the content of the color material in ink to be 0.5 mass % to 15.0 mass % with the total mass of ink taken as a reference. More favorably, it is preferable for the content to be 1.0 mass % to 10.0 mass %. As a specific example of pigment, there is inorganic pigment, such as carbon black, titanium oxide or the like. As another specific example of pigment, there is organic pigment, such as azo, phthalocyanine, quinacridone, isoindolinone, imidazolone, diketo pyrrolo pyrrole, dioxazine or the like.

As the dispersion method of pigment, it is possible to use resin dispersion pigment using a resin as a dispersant, self-dispersible pigment to the particle surface of which a hydrophilic group is bonded or the like. Further, it is possible to use resin-bonded pigment to the particle surface of which an organic group including a resin is bonded chemically, or microcapsule pigment whose particle surface is covered with a resin or the like.

It is preferable to use, as the resin dispersant for dispersing piment in an aqueous medium, a dispersant capable of dispersing pigment in the aqueous medium by the action of an anionic group. As the resin dispersant, favorably, it is possible to use a resin, to be described later, and more favorably, it is possible to use a water-soluble resin. It is preferable for the content (mass %) of pigment to be 0.3 to 10.0 times the content of the resin dispersant in terms of mass ratio (pigment/resin dispersant).

As the self-dispersible pigment, it is possible to use pigment to the particle surface of which an anionic group, such as a carboxylic acid group, a sulfonic acid group, and a phosphonic acid group, is bonded directly, or via another atomic group (—R—). The anionic group may be the acid type or the salt type. In a case where the anionic group is the salt type, the state may be either the state in which part of the anionic groups are dissociated or the state in which all the anionic groups are dissociated. As one example of cation, which is the counter ion in a case where the anionic group is the salt type, there is an alkali metal cation, ammonium, organic ammonium or the like. As a specific example of another atomic group (—R—), there are an arylene group, such as an alkylene group, a phenylene group, a naphthylene group or the like, which is a straight chain group or a branched group whose number of carbon atoms is 1 to 12, a carbonyl group, an imino group, an amide group, a sulfonic group, an ester group, an ether group and the like. As another specific example, there is a combination of these groups.

It is preferable for dye to have an anionic group. As a specific example of dye, there are azo, triphenylmethane, aza (phthalocyanine), xanthene, anthrapyridone and the like.

<Resin>

It is possible for ink to contain a resin. It is preferable for the content (mass %) of resin in ink to be 0.1 mass % to 20.0 mass % with the total mass of ink as a reference. More favorably, it is preferable for the content to be 0.5 mass % to 15.0 mass %.

As one example of the reason a resin is added to ink, there are two reasons as follows.

(i) To stabilize the dispersion state of pigment (that is, in order to use as the above-described resin dispersant or as assistance thereof).

(ii) To improve various characteristics of an image to be formed on the printing medium 101.

As one example of the aspect of resin, there are a block copolymer, a random copolymer, a graft copolymer, a combination of these copolymers and the like. Further, the resin may be in the state where the resin is dissolved in an aqueous medium as a water-soluble resin or in the state where the resin is dispersed in an aqueous medium as resin particles. It is not necessary for the resin particle to contain a color material.

In the present invention, the resin is water soluble means that in a case where the resin is neutralized with alkali equivalent to the acid value, no particle is formed, whose particle diameter can be measured by the dynamic light scattering method. Whether or not a resin is water soluble can be determined by a method as shown below. First, a liquid (resin solid content: 10 mass %) including a resin, which is neutralized by alkali (sodium hydroxide, potassium hydroxide and the like) corresponding to the acid value, is prepared. Next, the prepared liquid is diluted to ten times (on a volume basis) with pure water and a sample solution is prepared. Then, the particle diameter of the resin in the sample solution is measured by the dynamic light scattering method and in a case where a particle having the particle diameter is not measured, it is possible to determine that the resin is water soluble.

It is possible to set the measurement conditions at this time to, such as SetZero: 30 sec, number of times of measurement: three, and measurement time: 180 sec. As the particle size distribution measurement device, it is possible to use the particle size analyzer by the dynamic light scattering method (for example, product name "UPA-EX150", manufactured by Nikkiso Co., Ltd.) and the like. Of course, the particle size distribution measurement device, the measurement conditions and the like to be used are not limited to the example described above.

In a case of the water-soluble resin, it is preferable for the acid value of the resin to be 100 mgKOH/g to 250 mgKOH/g. In a case of the resin particle, it is preferable for the acid value of the resin to be 5 mgKOH/g to 100 mgKOH/g. In a case of the water-soluble resin, it is preferable for the weight average molecular weight of the resin to be 3,000 to 15,000. In a case of the resin particle, it is preferable for the weight average molecular weight of the resin to be 1,000 to 2,000,000. It is preferable for the volume average particle diameter of the resin particle, which is measured by the dynamic light scattering method (measurement conditions are the same as above) to be 100 nm to 500 nm.

As one example of the resin, there is an acrylic resin, an urethane resin, an olefine resin or the like. Among these resins, the acrylic resin or the urethane resin is preferable. It is preferable for the acrylic resin to have a hydrophilic unit and a hydrophobic unit as configuration units.

Among the acrylic resin, a resin is preferable which has a hydrophilic unit derived from a (meth)acrylic acid and a hydrophobic unit derived from at least one of a monomer having an aromatic ring and a (meth)acrylic acid ester monomer. Particularly, a resin is preferable which has a hydrophilic unit derived from a (meth)acrylic acid and a hydrophobic unit derived from a monomer of at least one of styrene and alpha-methylstyrene. These resins are likely to cause interaction with pigment, and therefore, it is possible favorably utilize them as a resin dispersant for dispersing pigment.

The hydrophilic unit is a unit having a hydrophilic group, such as an anionic group. It is possible to form a hydrophilic unit by, for example, polymerizing a hydrophilic monomer having a hydrophilic group. As a specific example of the hydrophilic monomer having a hydrophilic group, there is an acidic monomer having a carboxyl acid group, such as (meth)acrylic acid, itaconic acid, maleic acid, and fumaric acid, or an anionic monomer, such as an anhydride and a salt of these acidic monomers or the like. As one example of a cation configuring the salt of an acidic monomer, there is an ion, such as lithium, sodium, potassium, ammonium, or organic ammonium.

The hydrophobic unit is a unit not having a hydrophilic group, such as an anionic group. It is possible to form a hydrophobic unit by, for example, polymerizing a hydrophobic monomer not having a hydrophilic group, such as an anionic group. As a specific example of the hydrophobic monomer, there is a monomer having an aromatic ring, such as styrene, alpha-methylstyrene, and (meth)acrylic benzyl. As another specific example of the hydrophobic monomer, there is a (meth)acrylic acid ester monomer, such as methyl (meth)acrylate, butyl (meth)acrylate, or 2-ethylhexyl (meth) acrylate.

It is possible to obtain the urethane resin by, for example, causing poly isocyanate and polyol to react with each other. Further, it may also be possible to cause a chain extender to react. As one example of the olefin resin, there is polyethylene, polypropylene or the like.

<Aqueous Medium>

It is possible to cause ink to contain water, or an aqueous medium, which is a mixed solvent of water and a water soluble organic solvent. As water, it is preferable to use deionized water or ion exchange water. It is preferable for the content (mass %) of water in aqueous ink to be 50.0 mass % to 95.0 mass % with the total ink mass taken as a reference. Further, it is preferable for the content (mass %) of the water soluble organic solvent in the aqueous ink to be 3.0 mass % to 50.0 mass % with the total ink mass taken as a reference. The water soluble organic solvent is not limited as long as it can be used as ink for ink jet. As one example of the water soluble organic solvent, there are alcohols, (poly)alkylene glycols, glycol ethers, nitrogen-containing compounds, sulfur-containing compounds or the like.

<Wax>

Wax means, in a chemically strict meaning, an ester of fatty acid and high grade monohydric alcohols or dihydric alcohols, which are not soluble in water. However, the wax in the present specification means that as follows in a wide sense. The type of wax that can be used in the present embodiment is not limited particularly.

As a specific example of wax that can be used in the present embodiment, there is natural wax, such as beeswax, lanolin, carnauba wax, candelilla wax, or Montan wax. As another specific example of wax, there is petroleum wax, such as paraffin wax or microcrystalline wax. As another specific example of wax, there are further synthetic wax, such as Fischer-Tropsch Wax, polyethylene wax, polypropylene wax, or oxidized wax, and modified wax, such as urethane modified wax or alcohol modified wax Other than those, as another specific example of wax, there is alpha-olefin-maleic anhydride acid copolymer wax or the like. It may also be possible to use one type or a combination of two or more types of wax as needed.

<Other Additives>

Other than the components described above, it may also be possible for ink to contain various additives, such as an antifoaming agent, surfactant, pH adjuster, viscosity modifier, anti-rust agent, preservative, antifungal agent, antioxidant, or anti-reduction agent, as needed.

In a case where an image formation step of the present embodiment is completed, the printing medium 101 is conveyed from the image formation unit 103 to the drying unit 104.

<Drying Unit 104>

The drying unit 104 is configured so as to be capable of drying the printing medium 101 while fixing it and conveying the printing medium 101 to the fixing unit 105. In the present embodiment, the drying unit 104 comprises a second conveyance mechanism 114 and an air blowing mechanism 115. The second conveyance mechanism 114 comprises a second fixing mechanism 116 capable of fixing the printing medium 101 in the state where the printing medium 101 is maintained smoothly and a first heating mechanism 117 capable of heating the printing medium 101.

In a case where the printing medium 101 is a first type, the drying unit 104 dries the printing medium 101 by using a first drying method so that the water content of the printing medium 101 is included within a predetermined range. On the other hand, in a case where the printing medium 101 is a second type whose tendency to contain water is greater than that of the first type, there is a tendency for water more than an appropriate amount to have been absorbed, and therefore, the drying unit 104 dries the printing medium 101 by using a second drying method whose drying effect is higher than that of the first drying method.

In order to suppress the cockling of the printing medium 101, it is preferable for the water content of the printing medium 101 after a drying step is completed to be 10 mass % or less. In order to fix ink at a fixing step, it is preferable for the water content of the printing medium 101 after the drying step is completed to be not more than 10 mass % and not less than 2 mass %. More preferably, the water content of the printing medium 101 after the drying step of the present embodiment is completed is not more than 7 mass % and not less than 5 mass %. At the drying step, by drying the printing medium 101 so that the water content of the printing medium 101 is included within the above-described range, it is possible to suppress cockling.

Further, by drying the printing medium 101 so that the water content thereof is included within the above-described range, it is possible to maintain the viscosity of the liquid component in the reaction liquid and ink in a comparatively low state. By maintaining the viscosity of the liquid component in the reaction liquid and ink in a comparatively low state, the permeation of the solvent in ink into the printing medium 101 is facilitated. As described above, by causing the solvent to permeate into the printing medium 101, it is possible to improve the fastness of an image.

<Second Conveyance Mechanism 114>

The second conveyance mechanism 114 comprises the four second rotation axes 118 installed so as to extend in the Y-direction and arranged in the X-direction and a second belt 119 wound so as to be capable of rotating accompanying the rotation of the rotation axis. As one example of the material included in the second belt 119, there is a resin, metal or the like. In a case where a suction pump is used as the method of fixing the printing medium 101, it is recommended to bore many holes in the second belt 119. Due to this, it is made possible to fix the printing medium 101 by using the second fixing mechanism 116 arranged under the printing medium 101 on the second belt 119.

<Second Fixing Mechanism 116>

As long as it is possible to fix the printing medium 101 in the posture in which the smoothness thereof is maintained while heating the printing medium 101, the second fixing mechanism 116 may be any mechanism. As the second fixing mechanism 116, it is possible to appropriately use various mechanisms known conventionally. As the method of fixing the printing medium 101, absorption fixing, adhesive fixing or the like is preferable to others. Among them, the absorption fixing by a suction pump is preferable from the point of cost and energy efficiency.

For example, in a case where a suction pump is used as the second fixing mechanism 116, the suction pump is arranged under the second belt 119 in which many holes are bored. Then, by actuating the suction pump to cause a negative pressure to occur, it is possible to suck and fix the printing medium 101 on the second belt 119 through the holes bored in the second belt 119. In order to suppress the cockling of the printing medium 101 in the state where ink is applied thereto and maintain the smoothness thereof, it is preferable for the suction pressure of the suction pump to be not less than −0.3 kPa and not more than −50 kPa. More favorably, it is preferable for the suction pressure of the suction pump to be not less than −1 kPa and not more than −20 kPa.

<First Heating Mechanism 117>

The first heating mechanism 117 is configured so as to be capable of drying the printing medium 101 by heating it. As described above, in a case where the printing medium 101 is heated, it is also possible to suppress cockling by fixing the printing medium 101. The first heating mechanism 117 may be any mechanism as long as it is possible to heat the printing medium 101 and further adjust the heating temperature. For example, it is possible to appropriately use various mechanisms known conventionally. As one preferable example of the first heating mechanism 117, there is a radiant heating heater. There is also no particular limitation to the type of heater. It is possible to appropriately select a heater from among publicly known heaters and apply the heater. Among those, in view of safety, energy efficiency and the like, an electric wire heater, an infrared heater or the like is preferable. It may also be possible to use a heat roller inside of which a heating source is arranged as the first heating mechanism 117. It is preferable for the heating temperature of the first heating mechanism 117 in a case where the printing medium 101 is heated to be not less than 40 °C and not more than 100 °C. More preferably, the heating temperature is not less than 60 °C and not more than 80 °C.

In the present embodiment, in a case where the basis weight of the printing medium 101 is comparatively small, there is a tendency for water to have been absorbed somewhat more than an appropriate amount, and therefore, the heating temperature of the first heating mechanism 117 in a case where the printing medium 101 is dried is set so that the heating temperature is comparatively high. On the other hand, in a case where the basis weight of the printing medium 101 is comparatively large, there is a tendency for water to have been absorbed somewhat less than an appropriate amount, and therefore, the heating temperature of the first heating mechanism 117 is set so that the heating temperature is comparatively low. By setting the heating temperature of the first heating mechanism 117 in association with the basis weight as above, it is made possible to control the water content of the printing medium 101 after the drying step to be not more than 10 mass % and not less than 2 mass %.

The setting of the heating temperature of the first heating mechanism 117 was performed as follows. First, drying was performed in a variety of states where the type (basis weight) of the printing medium and the heating temperature were set differently. Then, the water content of the printing medium 101 after the drying step was calculated by measuring the amount of water in the reaction liquid and ink after drying by an infrared water-content meter and by finding the percentage of the measured value to the basis weight of the printing medium. After this, the heating temperature that brings about the state where the water content thus found is not more than 10 mass % and not less than 2 mass % was set in association with each basis weight.

<Air Blowing Mechanism 115>

The air blowing mechanism 115 is configured so as to be capable of drying a printing medium onto which ink is applied by the ink application mechanism 113 by blowing air. As long as it is possible for the air blowing mechanism 115 to dry the printing medium 101 and further to adjust the airflow volume, the air blowing mechanism 115 may be any mechanism. As one preferable example of the air blowing mechanism 115, there is a warm air drier. There is also no limitation to the type of warm air drier. It is possible to appropriately select and apply a warm air drier from among publicly known warm air driers.

It is preferable for the temperature of air to be blown to be not lower than 40 °C and not higher than 100 °C. More preferably, the temperature of air to be blown is not lower than 60 °C and not higher than 80 °C. It may be possible to determine the airflow volume in accordance with the type (for example, basis weight) of the printing medium 101 within a range, for example, not less than 50 $m^3$/min and not more than 200 $m^3$/min.

The setting of the airflow volume in a case where air is blown was performed as follows. First, drying was performed in a variety of states where the type (basis weight) of the printing medium and the airflow volume in a case where air is blown were set differently. Then, the water content of the printing medium 101 after the drying step was calculated by measuring the amount of water in the reaction liquid and ink after drying by an infrared water-content meter and by finding the percentage of the measured value to the basis weight of the printing medium. After this, the airflow volume that brings about the state where the water content thus found is not more than 10 mass % and not less than 2 mass % was set in association with each basis weight. Further, the combination of the heating temperature of the first heating mechanism 117 and the airflow volume of the air blowing mechanism 115 that brings about the state where the water content is not more than 10 mass % and not less than 2 mass % was set in association with the type of printing medium.

<Fixing Unit 105>

The fixing unit 105 is configured so as to be capable of heating and solidifying ink applied onto the printing medium 101. In the fixing unit 105, the printing medium 101 on which an image is formed is heated and dried, and thereby, a film is formed by resin particles included in ink. The fixing unit 105 is not limited particularly, and it is possible to appropriately use various devices known conventionally. It is preferable for the fixing unit 105 to include a fixing belt, a fixing roller or the like. In this example, a heating source (for example, IR heater or the like) is arranged outside a roller (rotation axis) and a fixing belt is heated to a predetermined temperature. The fixing unit 105 comprises a third conveyance mechanism 120 and a fourth conveyance mechanism 121.

<Third Conveyance Mechanism 120>

The third conveyance mechanism 120 comprises the four third rotation axes 122, a third belt 123 wound so as to be capable of rotating accompanying the rotation of the third rotation axis 122, and a second heating mechanism 124 as a heating source arranged outside the third rotation axis 122. The third rotation axis 122 is installed so as to extend in the Y-direction and arranged in the X-direction. The second heating mechanism 124 (for example, halogen heater) is heated to a predetermined temperature and configured so as to be capable of heating the third belt 123.

<Fourth Conveyance Mechanism 121>

The fourth conveyance mechanism 121 comprises the four fourth rotation axes 125, a fourth belt 126 wound so as to be capable of rotating accompanying the rotation of the fourth rotation axis 125, and a third heating mechanism 127 as a heating source arranged outside the fourth rotation axis 125. The fourth rotation axis 125 is installed so as to extend in the Y-direction and arranged in the X-direction. The third heating mechanism 127 (for example, halogen heater) is heated to a predetermined temperature and configured so as to be capable of heating the fourth belt 123.

<Fixing of Ink>

In the fixing unit 105, in order to fix an image onto the printing medium 101, the solid content included ink with which an image is formed is softened by heat. As a specific example of the solid content, there is a resin particle having a softening point. That is, in the fixing unit 105, temperature and pressure for causing ink to stick firmly to the printing medium 101 are applied. For example, it is preferable for the surface temperature of the fixing unit 105 immediately before coming into contact with the printing medium 101 to be not lower than 60 °C and not higher than 120 °C. More preferably, the surface temperature of the fixing unit 105 is not lower than 70 °C and not higher than 100° C.

The ink film thickness in the present embodiment is 5 μm. Like this, the ink film is comparatively thin, and therefore, the temperature of the ink at the fixing step is substantially the same temperature as the contact temperature between the fixing unit 105 and the printing medium 101. According to the configuration such as this, the contact temperature between the fixing unit 105 and the printing medium 101 becomes a temperature higher than or equal to the softening point of the resin particle of the ink. Because of this, the resin particle included in the ink softens and a film is formed.

By the ink being turned into a film on the printing medium 101 as described above, it is possible to obtain an image excellent in scratch resistance and of high quality. In addition, by improving the surface smoothness of an image formed on the printing medium 101 by the fixing unit 105, it is possible to obtain an image whose glossiness is high, and therefore, it is possible to obtain an image excellent in scratch resistance and of high quality. That is, through the fixing step, it is possible to obtain an ink jet-printed image whose fastness and coloring property are favorable.

<Discharge Unit 106>

The printing medium 101 conveyed from the fixing unit 105 to the discharge unit 106 is stacked inside of the discharge unit 106.

<Control System>

Figure 2:
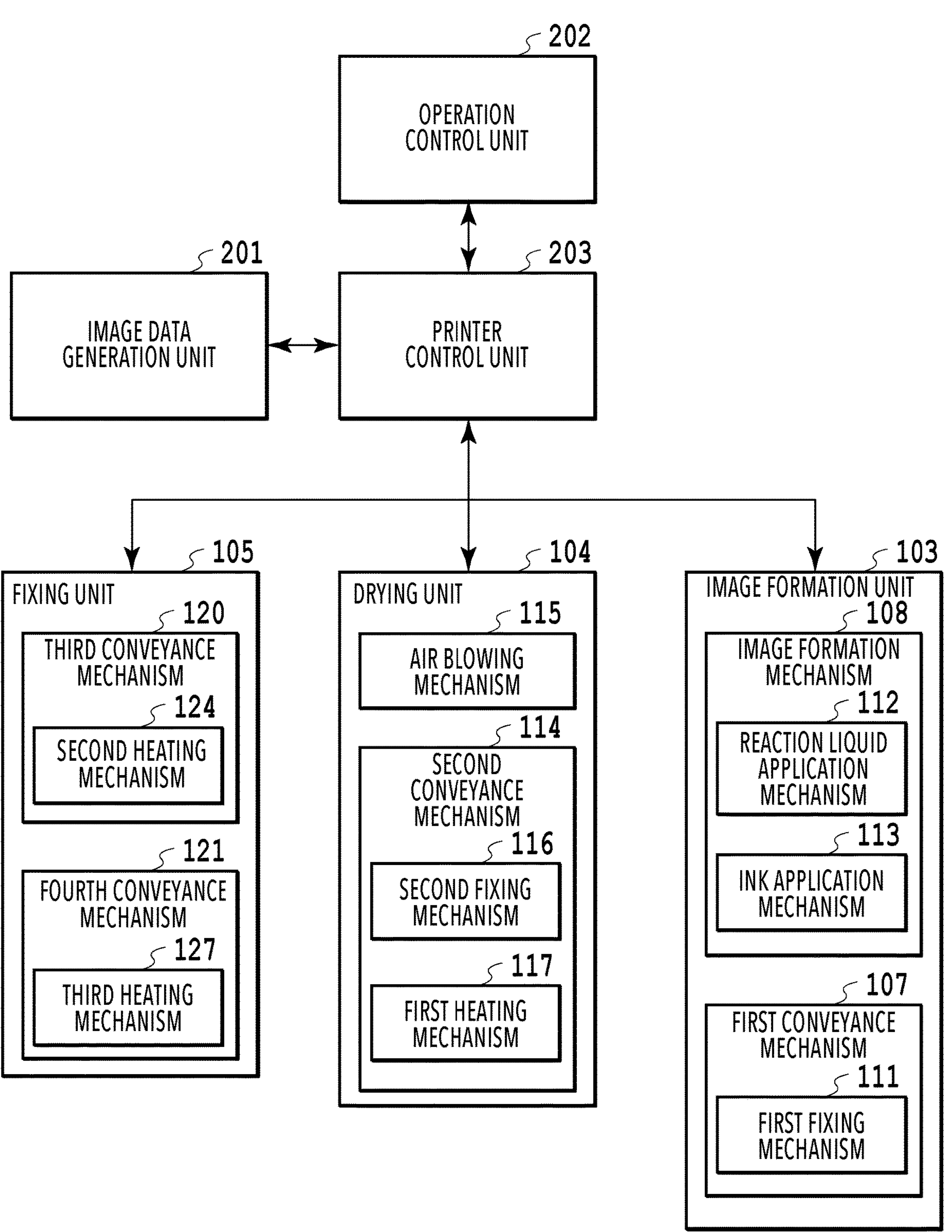
FIG. 2 is a block diagram showing a control system of the whole printing apparatus in one embodiment.

FIG. 2 is a block diagram showing the control system of the whole apparatus in the printing apparatus 100. The printing apparatus 100 has the control system controlling each unit shown in FIG. 1.

As shown in FIG. 2, the printing apparatus 100 comprises, as the control system, an image data generation unit 201, an operation control unit 202, and a printer control unit 203. It is possible for the image data generation unit 201, the operation control unit 202, the image formation unit 103, the drying unit 104, and the fixing unit 105 to perform transmission and reception of data with one another via the printer control unit 203.

The image data generation unit 201 receives image data from a print server or the like arranged outside the printing apparatus and transmits the image data to the printer control unit 203. The operation control unit 202 is configured so as to include an operation panel or the like (not shown schematically) for a user to input instructions to the printing apparatus. The instructions input to the operation control unit 202 are transmitted to the printer control unit 203. Based on the image data received from the image data generation unit 201 and the instructions input to the operation control unit 202, the printer control unit 203 performs print processing for a printing medium by controlling the image formation unit 103, the drying unit 104, and the fixing unit 105, respectively.

<Printer Control Unit 203>

Figure 3:
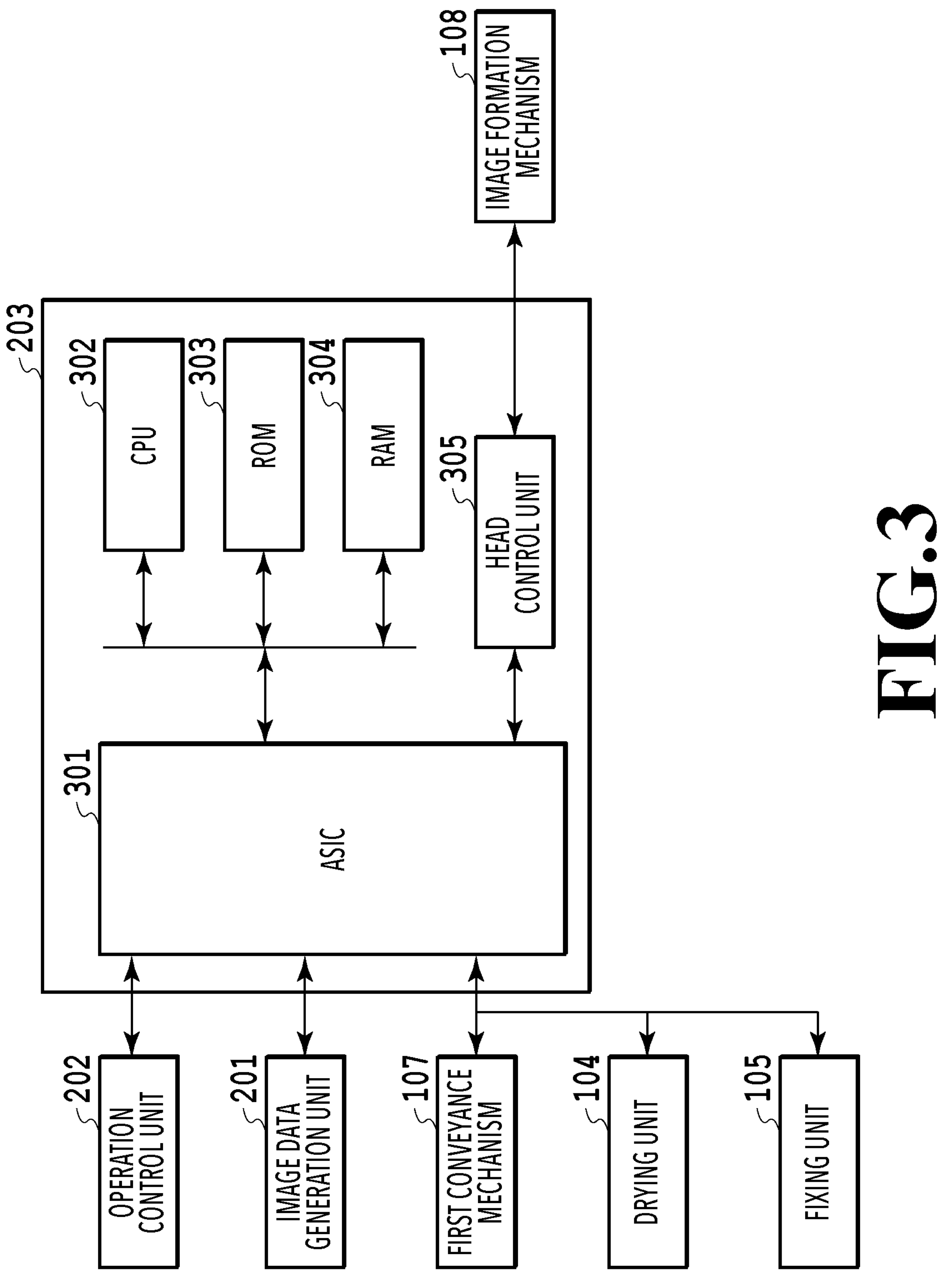
FIG. 3 is a block diagram of a printer control unit in one embodiment.

FIG. 3 is a block diagram of the printer control unit 203 in the present embodiment.

As shown in FIG. 3, the printer control unit 203 comprises an ASIC (Application Specific Integrated Circuit) 301, a CPU 302, a ROM 303, a RAM 304, and a head control unit 305.

The ASIC 301 is connected with the CPU 302, the ROM 303, the RAM 304, and the head control unit 305 via a bus. It is possible for the ASIC 301 to perform transmission and reception of data necessary for print processing in the present embodiment with each of the CPU 302, the ROM 303, the RAM 304, and the head control unit 305 via a bus.

The ASIC 301 is an application specific integrated circuit. The ASIC 301 of the present embodiment is used for performing print processing for a printing medium. In the ASIC 301, a network controller, a serial IF controller, an image data generation controller, a motor controller and the like are incorporated.

It is possible for the ASIC 301 to perform transmission and reception of data necessary for performing print processing for a printing medium with each of the image data generation unit 201 and the operation control unit 202. Further, it is possible for the ASIC 301 to perform transmission and reception of data necessary for conveyance of a printing medium with each of the first conveyance mechanism 107, the second conveyance mechanism in the drying unit 104, and the third conveyance mechanism and the fourth conveyance mechanism in the fixing unit 105. Furthermore, it is possible for the ASIC 301 to perform transmission and reception of data necessary for fixing a printing medium with the first fixing mechanism in the first conveyance mechanism 107 and the second fixing mechanism in the drying unit 104.

In the present embodiment, it is possible for the ASIC 301 to perform transmission and reception of data necessary for drying ink on a printing medium with the first heating mechanism and the air blowing mechanism in the drying unit 104. Further, it is possible for the ASIC 301 to perform transmission and reception of data necessary for fixing ink on a printing medium with the second heating mechanism and the third heating mechanism in the fixing unit 105.

The CPU 302 comprehensively controls the whole printing apparatus. The ROM 303 stores control programs of the CPU 302. In the present embodiment, in the ROM 303, a table is stored, in which the type of printing medium and the setting contents of the airflow volume of the air blowing mechanism and the temperature of the heating mechanism are associated with each other in advance. Before the start of print processing, an operator inputs the paper type (including basis weight) for which printing is to be performed to the operation control unit 202. Then, the CPU 302 sets the airflow volume, the temperature of air to be blown, and the heating temperature of the heating mechanism in a case where a printing medium is dried by determining the paper type input by the operator with reference to the above-described table. The RAM 304 executes the control program stored in the ROM 303.

The head control unit 305 generates final ejection data, which is image data to be transmitted finally to the image formation mechanism 108. It is possible to transmit and receive the final ejection data between the ASIC 301 and the image formation mechanism 108 via the head control unit 305. Further, the head control unit 305 also generates a drive voltage for driving the image formation mechanism 108.

<Flow of Print Processing in Printing Apparatus>

Figure 4:
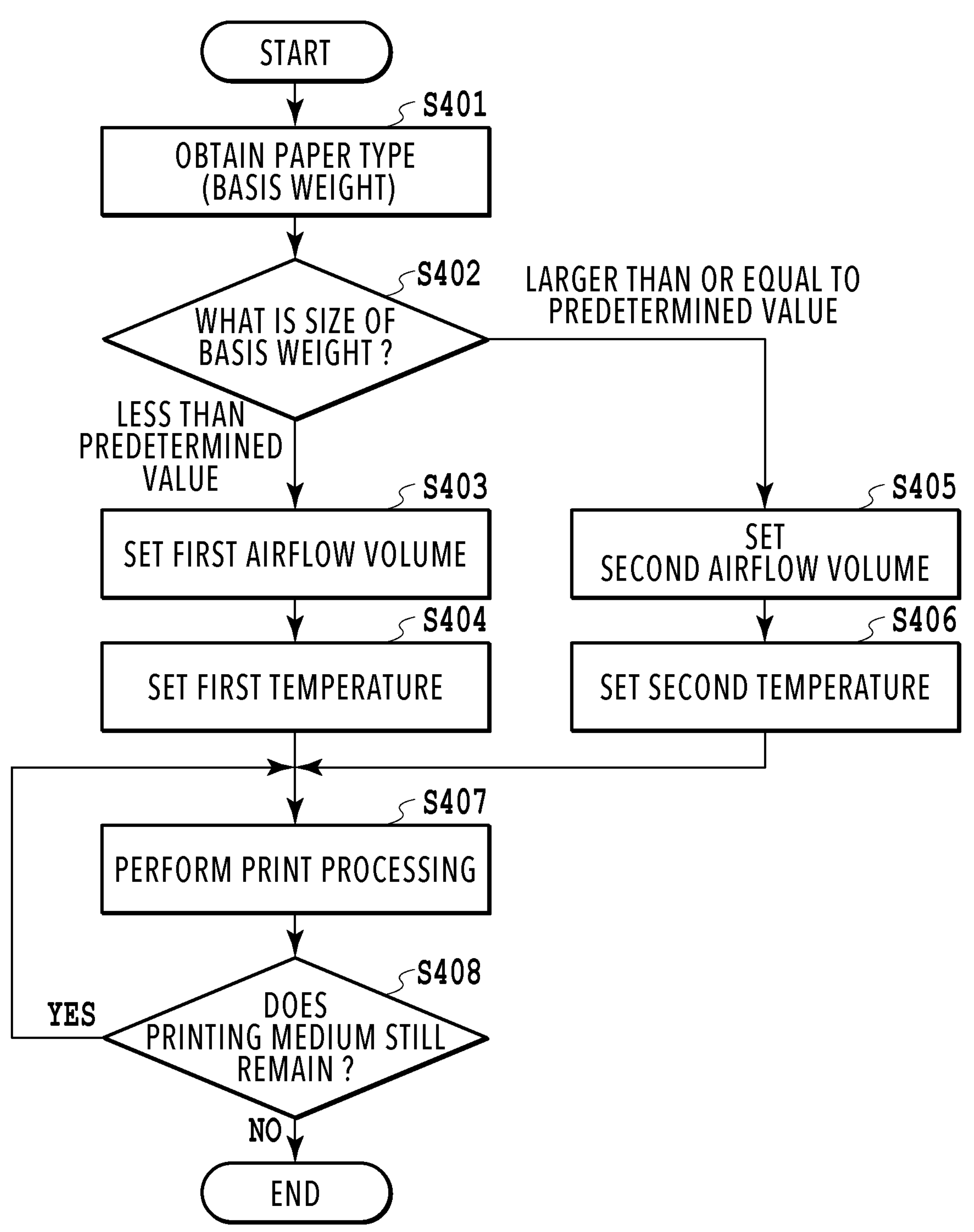
FIG. 4 is a flowchart showing one example of print processing performed by the printing apparatus in one embodiment.

FIG. 4 is a flowchart showing one example of print processing performed by the printing apparatus in the present embodiment. The series of processing in FIG. 4 is performed by the CPU comprised by the printing apparatus loading a program code stored in the ROM or the like onto the RAM and executing the program code.

Further, part of or all the functions at the steps in FIG. 4 may be implemented by hardware, such as an ASIC or an electronic circuit. A symbol "S" in the explanation of each piece of processing means that the step is a step in the flowchart in FIG. 4. For example, by taking the operator inputting the paper type including the basis weight of the printing medium to the printing apparatus and pressing down the button to perform print processing as a trigger, the series of processing in FIG. 4 is started.

At S401, the CPU obtains the paper type including the basis weight of a print processing-target printing medium. In this example, as described above, the paper type is input by an operator. After completing the processing at this step, the CPU performs the processing at S402.

At S402, the CPU allocates processing to be performed later in accordance with the size of basis weight of the print processing-target printing medium. In a case where the size of basis weight is less than a predetermined value, the CPU performs the processing at S403. On the other hand, in a where the size of basis weight is larger than or equal to the predetermined value, the CPU performs the processing at S405. That is, the CPU performs different processing in accordance with the obtained paper type after completing the processing at this step. For example, the basis weight of between 80 gsm and 350 gsm is preferred. It is further preferred if the basis weight is between 120 gsm and 250 gsm. It may also be possible for the predetermined value that is referred to at this step to be stored in advance in the ROM 303 (see FIG. 3) or to be selected or set arbitrarily by a user.

At S403, the CPU sets the airflow volume of the air blowing mechanism so that the airflow volume in a case where air is blown to a printing medium is a first airflow volume. After completing the processing at this step, the CUP performs the processing at S404.

At S404, the CPU sets the temperature of the heating mechanism comprised by the conveyance device so that the heating temperature in a case where a printing medium is heated is a first temperature. After completing the processing at this step, the CPU performs the processing at S407.

At S405, the CPU sets the airflow volume of the air blowing mechanism so that the airflow volume in a case where air is blown to a printing medium is a second airflow volume smaller than the first airflow volume After completing the processing at this step, the CPU performs the processing at S406.

At S406, the CPU sets the temperature of the heating mechanism comprised by the conveyance device so that the heating temperature in a case where a printing medium is heated is a second temperature lower than the first temperature. After completing the processing at this step, the CPU performs the processing at S407.

At S407, the CPU performs print processing for a printing medium after reflecting the setting of the airflow volume and the heating temperature described above in the drying unit 104. After completing the processing at this step, the CPU performs the processing at S408.

At S408, the CPU allocates the contents of the processing to be performed thereafter in accordance with whether or not there remains a printing medium for which the print processing has not been performed yet. In a case where there remains no printing medium for which the print processing has not been performed, after completing the processing at this step, the CPU terminates the present processing. On the other hand, in a case where there remains a printing medium for which the print processing has not been performed, the CPU repeats the processing at S407 to S408. In a case where the print processing has been performed for all the print processing-target printing media, the CPU terminates the series of print processing.

As explained above, in the present embodiment, based on the size of basis weight of a printing medium, the airflow volumes and the heating temperatures of the drying unit are switched. Consequently, according to the printing method of the present embodiment, it is possible to appropriately dry a printing medium. In FIG. 4, the example is shown in which the airflow volume and the heating temperature are set in accordance with the basis weight of a printing medium, but the tendency for a printing medium to contain water or the degree of cockling also depends on the material configuring the printing medium, not only on the basis weight. Consequently, at S402, it is preferable to set the output of the drying unit in accordance with the type, size or the like of a printing medium, not only with the basis weight.

Further, in the above-described embodiment, the airflow volume of the air blowing mechanism and the heating temperature in the first heating mechanism are adjusted, but the adjustment target may be only one of them. Further, in the above-described embodiment, the two levels are prepared for the airflow volume of the air blowing mechanism and the heating temperature of the first heating mechanism, respectively, but it may also be possible to prepare more levels.

In the following, by using the exemplary embodiments of the embodiment described above and comparative examples to be compared with these exemplary embodiments, the present invention is explained in more detail. The present invention is not limited at all by the following exemplary embodiments as long as the gist of the present invention is not exceeded. In the description of the following exemplary embodiments, "part" means a mass basis unless described particularly.

In the following exemplary embodiments and comparative examples, the printing apparatus 100 (see FIG. 1) was used. The conveyance speed was set to 0.5 m/s.

As the printing medium 101 (see FIG. 1), coated paper and non-coated paper were used. As coated paper, Aurora Coat (manufactured by Nippon Paper Industries Co., Ltd., basis weight 84.9, 209.4 g/m$^2$) was used, onto the printing medium surface of which chemicals, such as white pigment, are applied with a glue material, such as starch and latex. As non-coated sheet, OK Prince High Quality (manufactured by Oji Paper Co., Ltd., basis weight 84.9, 209.4 g/m$^2$) was used.

As the reaction liquid applied by the reaction liquid application mechanism 112, the following composition was used. The application amount was set to 2 g/m$^2$. The remaining part of the ion exchange water refers to the amount with which the total of all the components configuring the reaction liquid becomes 100.0 mass parts.

glutaric acid 21.0 mass parts
potassium hydroxide 2.0 mass parts
glycerin 5.0 mass parts
surfactant (product name: MegaFac F444, manufactured by DIC Corporation) 5.0 mass parts
ion exchange water remaining part The ink application mechanism 113 (see FIG. 1) used the ink jet head of the type performing ink ejection by the on-demand method by using an electrothermal conversion element. The ink application amount was set to 18 g/m$^2$. The ink was prepared as follows.

<Preparation of Pigment Dispersant>

First, 10 parts of carbon black, 15 parts of resin aqueous solution, and 75 parts of pure water were mixed. As the carbon black, product name: Monarch 1100 (manufactured by Cabot) was used. As the resin aqueous solution, an aqueous solution of styrene-acrylic acid ethyl-acrylic acid copolymer, whose acid value is 150, whose weight average molecular weight (Mw) is 8,000, and whose content of resin is 20.0 mass %, neutralized with a potassium hydroxide aqueous solution was used.

Next, this mixture was input to a batch-type vertical sand mil (manufactured by IMECS Co., Ltd.) and the mixture was filled with 200 parts of zirconia beads whose diameter is 0.3 mm, and then, dispersion processing was performed for five hours while cooling with water. Then, the dispersion liquid was separated centrifugally and after large particles were removed, a black pigment dispersant whose content of pigment is 10.0 mass % was obtained.

<Preparation of Resin Particle Dispersant>

First, 20 parts of ethylmethacrylate, 3 parts of 2,2'-Azobis-(2-methyl butyronitrile), and 2 parts of n-hexadecane were mixed and stirred for half an hour. Next, this mixture was dropped into 75 parts of 8% aqueous solution of styrene-acrylic acid butyl-acrylic acid copolymer (acid value: 130 mgKOH/g, weight average molecular weight (Mw): 7,000) and the aqueous solution was stirred for half an hour. Next, by using an ultrasonic irradiation machine, the aqueous solution was irradiated with ultrasound for three hours.

Following this, under the nitrogen atmosphere at 80 °C, polymerization reaction was performed for four hours and after the temperature was lowered to the ambient temperature, filtering was performed and a resin particle dispersant whose content of resin is 25.0 mass % was prepared. It is possible to adjust the content of resin of the resin particle dispersant by performing dilution or concentration as needed. The softening point of this resin is 90 °C. This softening point was measured in conformity with JIS K 6828-2 "Determination of minimum film-forming temperature". That is, the resin dispersant was heated under an appropriate temperature gradient and the temperature of the boundary between the transparent portion at which film is formed and the portion at which no film is formed was measured. The minimum film-forming temperature of the resin dispersant was measured by using Minimum Film Forming Temperature (product name: MFFTB90, manufactured by Rhopoint Instruments).

<Preparation of Ink>

The resin particle dispersant obtained by the above-described method and the pigment dispersant were mixed with each component described below. The remaining part of the ion exchange water refers to the amount with which the total of all the components configuring the ink becomes 100.0 mass %. The solid content percentage in ink is 10.0 mass %.

pigment 4.0 mass % resin particle 6.0 mass % glycerin 7.0 mass % polyethylene glycol (number average molecular weight (Mn): 1,000) 1.0 mass % surfactant (Acetylenol (registered trademark) E100, manufactured by Kawaken Fine Chemical Co., Ltd.) 0.5 mass % wax (Hi-Mic-2095 (manufacture by NIPPON SEIRO CO., LTD.) microcrystalline wax (melting point: 103 °C) 1.0 mass % ion exchange water remaining part

After these were stirred sufficiently and dispersed, pressure filtering was performed with a microfilter (manufactured by FUJIFILM Corporation) whose pore size is 3.0 μm and a black ink was prepared.

In the drying unit 104 (see FIG. 1) drying ink, the setting was performed so that the surface temperature of the printing medium 101 (see FIG. 1) becomes a predetermined temperature by using a warm air drier. The surface temperature of the printing medium was measured by using the radiation thermometer (product name, IT-545; HORIBA, Ltd.).

In the fixing unit 105 (see FIG. 1), a fixing belt was used in which it is possible to perform heating from the inside of the belt with a halogen heater. The temperature of the surface of the fixing unit 105 immediately before coming into contact with the printing medium 101 was set so that the temperature at the portion at which the fixing unit 105 and the printing medium come into contact with each other becomes a predetermined temperature.

FIG. 5 is a diagram showing the types and the thermophysical property values of the materials used for the surface of the fixing member that comes into contact with the printing medium. The surface temperature of the fixing member was measured by using the radiation thermometer (product name, IT-545; HORIBA, Ltd.). Under the above conditions, a solid image was printed on the entire surface of the printing medium 101 of A4 size.

<Evaluation>

For the image samples obtained by the above-described method, evaluation was performed by the following evaluation method. Evaluation results are shown in [Table 1] in FIG. 5. In the exemplary embodiments and comparative examples, A and B of the evaluation criterion of each of the following evaluation items were taken as a preferable level and C was taken as an unacceptable level.

<Evaluation of Scratch Resistance>

In the exemplary embodiments and comparative examples, as the evaluation of the fastness of an image, the scratch test as follows was performed. Fastness test fabric to which 50 μL of artificial sweat was applied was wound around an abrader 120 g in weight of Color Fastness Rubbing Tester and for the image portion in the image sample, the reciprocal scratch test was performed one to ten times. As the artificial sweat, "JIS L 0804 alkaline pH 8.0" was used. As the fastness test fabric, "JIS L 0803 attached white fabric cotton for dyeing fastness test: model No. 670101" was used. As Color Fastness Rubbing Tester, "AB-301 manufactured by TESTER SANGYO CO., LTD." was used.

First, to the fastness test fabric (JIS L 0803 attached white fabric cotton for dyeing fastness test: model No. 670101), 50 μL of artificial sweat (JIS L 0804 alkaline pH 8.0) was applied. Next, the fastness test fabric was wound around the abrader 120 g in weight of Color Fastness Rubbing Tester (product name, AB-301: manufactured by TESTER SANGYO CO., LTD.) and for the image portion in the image sample, the reciprocal scratch test was performed one to ten times. Then, the non-image portion and the test fabric after the scratch test were observed.

A: In the one-time reciprocal scratch test, no sticking of ink to the test fabric was observed.

B: Slight amount of ink stuck to the test fabric and slight sticking of ink by scratch was observed in the non-image portion, but the level was ignorable.

C: Ink stuck to the test fabric and considerable sticking of ink by scratch was observed in the non-image portion.

<Cockling Property>

The image portion of a sample for cockling evaluation (solid image on the entire surface of A4 size) manufactured in the exemplary embodiments and comparative examples was observed visually. The evaluation criteria were as follows.

A: No winding was observed in the image portion

B: Winding was observed in the image portion, but it was at a level that does not bring any problem in actual use.

C: Winding was conspicuous in the image portion and it was at a level that brings about a problem in actual use.

The combinations shown in [Table 1] in FIG. 5 were discussed for the airflow volume at the time of blowing air in a case where the printing medium is dried, the temperature of warm air, the temperature at which the undersurface of the printing medium (also called "undersurface heating temperature") is heated, and the water content of the printing medium after warm air drying, and the evaluation results were shown. Further, the temperature of the ink applied by the ink application mechanism was 35 °C.

In Exemplary embodiment 1, the airflow volume in a case where coated paper 1 whose basis weight is 84.9 gsm is dried was set to 200 $m^3$/min and the undersurface heating temperature was set to 80 °C. According to the drying method such as this, it is possible to blow a sufficiently large airflow volume to coated paper 1 whose basis weight is comparatively small. Further, by setting the airflow volume in this manner, it was also possible to maintain the viscosity of the liquid component in the reaction liquid and ink in the low state, and therefore, it was also possible to cause the solvent in ink to permeate into coated paper 1 sufficiently. As a result of that, it was possible to dry coated paper 1 so that the water content is not more than 10 mass % and not less than 2 mass %. That is, by performing printing under the conditions shown in Exemplary embodiment 1, it was possible to obtain the fastness (scratch resistance) of the image while suppressing cockling.

In Exemplary embodiment 2, the airflow volume in a case where coated paper 2 whose basis weight is 209.4 gsm is dried was set to 50 $m^3$/min and the undersurface heating temperature was to to 80 °C. According to the drying method such as this, it is possible to blow a comparatively small airflow volume to coated paper 2 whose basis weight is comparatively large. Further, by setting the airflow volume in this manner, it was also possible to maintain the viscosity of the liquid component in the reaction liquid and ink in the low state, and therefore, it was also possible to cause the solvent in ink to permeate into coated paper 2 sufficiently. As a result of that, it was possible to dry coated paper 2 so that the water content is not more than 10 mass % and not less than 2 mass %. That is, by performing printing under the conditions shown in Exemplary embodiment 2, it was possible to obtain the fastness of the image while suppressing cockling.

Particularly, in Exemplary embodiment 1 and Exemplary embodiment 2, it was possible to obtain the best results for the evaluation of the scratch resistance (fastness of image) for coated paper and the cockling evaluation.

In Exemplary embodiment 3, the airflow volume in a case where coated paper 1 is dried was set to 100 $m^3$/min and the undersurface heating temperature was set to 100 °C. According to the drying method such as this, heating is performed at a comparatively high temperature for coated paper 1 whose basis weight is comparatively small. Further, by setting the undersurface heating temperature in this manner, it was also possible to maintain the viscosity of the liquid component in the reaction liquid and ink in the low state, and therefore, it was also possible to cause the solvent in ink to permeate into coated paper 1. As a result of that, it was possible to dry coated paper 1 so that the water content is not more than 10 mass % and not less than 2 mass %. That is, by performing printing under the conditions shown in Exemplary embodiment 3, it was possible to obtain the fastness of the image while suppressing cockling. With the drying method in Exemplary embodiment 3, the fastness of the image is reduced compared to that of the drying method in Exemplary embodiment 1, but it was at an ignorable level.

In Exemplary embodiment 4, the airflow volume in a case where coated paper 2 is dried was set to 100 $m^3$/min and the undersurface heating temperature was set to 60 °C. According to the drying method such as this, heating is performed at a comparatively low temperature for coated paper 2 whose basis weight is comparatively small. Further, by setting the undersurface heating temperature in this manner, it was also possible to maintain the viscosity of the liquid component in the reaction liquid and ink in the low state, and therefore, it was also possible to cause the solvent in ink to permeate into coated paper 2. As a result of that, it was possible to dry coated paper 2 so that the water content is not more than 10 mass % and not less than 2 mass %. That is, by performing printing under the conditions shown in Exemplary embodiment 4, it was possible to obtain the fastness of the image while suppressing cockling. With the drying method in Exemplary embodiment 4, the cockling evaluation is reduced compared to that of the drying method in Exemplary embodiment 2, but it was at a level that does not bring about any problem in actual use.

As shown in Comparative example 1, even in a case where the airflow volume in a case where coated paper 1 is dried is set smaller than that in Exemplary embodiment 1, it is possible to obtain the fastness (scratch resistance) of the image. However, the airflow volume in a case where coated paper 1 is dried is too small for the basis weight of coated paper 1, and therefore, the water content of coated paper 1 becomes 10 mass % or more. As a result of that, cockling becomes more likely to occur than in Exemplary embodiment 1.

As shown in Comparative example 2, even in a case where the airflow volume in a case where coated paper 2 is dried is set larger than that in Exemplary embodiment 2, it is possible to suppress cockling. However, the airflow volume in a case where coated paper 2 is dried is too large for the basis weight of coated paper 2, and therefore, the water content of coated paper 2 becomes 2 mass % or less. That is, with the airflow volume such as this, due to excessive drying, the viscosity of the liquid component in the reaction liquid and ink becomes high, and therefore, the permeation into coated paper 2 is suppressed and the film formation of ink after the fixing step is impeded. As a result of that, the fastness of the image is reduced compared to that in Exemplary embodiment 2.

As shown in Comparative example 3, even in a case where the undersurface heating temperature in a case where coated paper 1 is dried is set lower than that in Exemplary embodiment 3, it is possible to obtain the fastness of the image. However, the undersurface heating temperature in a case where coated paper is dried is too low for the basis weight of coated paper 1, and therefore, the water content of coated paper 1 becomes 10 mass % or more. As a result of that, cockling becomes more likely to occur than in Exemplary embodiment 3.

As shown in Comparative example 4, even in a case where the undersurface heating temperature in a case where coated paper 2 is dried is set higher than that in Exemplary embodiment 4, it is possible to suppress cockling. However, the undersurface heating temperature in a case where coated paper 2 is dried is too high for the basis weight of coated paper 2, and therefore, the water content becomes 2 mass % or less. That is, with the surface heating temperature such as this, due to excessive drying, the viscosity of the liquid component in the reaction liquid and ink becomes high, and therefore, the permeation into coated paper 2 is suppressed and the film formation of ink after the fixing step is impeded. As a result of that, the fastness of the image is reduced compared to that in Exemplary embodiment 4.

In Exemplary embodiment 5, the airflow volume in a case where coated paper 1 whose basis weight is 84.9 gsm is dried was set to 200 $m^3$/min and the undersurface heating temperature was to 80 °C. According to the drying method such as this, it is possible to blow a sufficiently large airflow volume to non-coated paper 1 whose basis weight is comparatively small. Further, by setting the airflow volume in this manner, it was also possible to maintain the viscosity of the liquid component in the reaction liquid and ink in the low state, and therefore, it was also possible to cause the solvent in ink to permeate into non-coated paper 1 sufficiently. As a result of that, it was possible to dry non-coated paper 1 so that the water content is not more than 10 mass % and not less that 2 mass %. That is, by performing printing under the conditions shown in Exemplary embodiment 5, it was possible to obtain the fastness of the image while suppressing cockling. With the drying method of Exemplary embodiment 5, the cockling evaluation was reduced compared to that with the drying method of Exemplary example 7 (to be described later), but it was at a level that does not bring any problem in actual use.

In Exemplary embodiment 6, the airflow volume in a case where non-coated paper 2 whose basis weight is 209.4 gsm is dried was set to 50 $m^3$/min and the undersurface heating temperature was to 80 °C. According to the drying method such as this, it is possible to blow a comparatively small airflow volume to non-coated paper 2 whose basis weight is comparatively large. Further, by setting the airflow volume in this manner, it was also possible to maintain the viscosity of the liquid component in the reaction liquid and ink in the low state, and therefore, it was also possible to cause the solvent in ink to permeate into non-coated paper 2 sufficiently. As a result of that, it was possible to dry non-coated paper 2 so that the water content is not more than 10 mass % and not less than 2 mass %. That is, by performing printing under the conditions shown in Exemplary embodiment 6, it was possible to obtain the fastness of the image while suppressing cockling.

In Exemplary embodiment 7, the airflow volume in a case where non-coated paper 1 is dried was set to 100 $m^3$/min and the undersurface heating temperature was set to 100 °C. According to the drying method such as this, heating is performed at a comparatively high temperature for non-coated paper 1 whose basis weight is comparatively small. Further, by setting the undersurface heating temperature in this manner, it was also possible to maintain the viscosity of the liquid component in the reaction liquid and ink in the low state, and therefore, it was also possible to cause the solvent in ink to permeate into non-coated paper 1. As a result of that, it was possible to dry non-coated paper 1 so that the water content is not more than 10 mass % and not less than 2 mass %. That is, by performing printing under the conditions shown in Exemplary embodiment 7, it was possible to obtain the fastness of the image while suppressing cockling. Particularly, in Exemplary embodiment 7, it was possible to obtain the best results for the evaluation of the scratch resistance (fastness of image) for non-coated paper and the cockling evaluation.

In Exemplary embodiment 8, the airflow volume in a case where non-coated paper 2 is dried was set to 100 $m^3$/min and the undersurface heating temperature was set to 80 °C. According to the drying method such as this, heating is performed at a comparatively low temperature for non-coated paper 2 whose basis weight is comparatively large. Further, by setting the undersurface heating temperature in this manner, it was also possible to maintain the viscosity of the liquid component in the reaction liquid and ink in the low state, and therefore, it was also possible to cause the solvent in ink to permeate into non-coated paper 2. As a result of that, it was possible to dry non-coated paper 2 so that the water content is not more than 10 mass % and not less than 2 mass %. That is, by performing printing under the conditions shown in Exemplary embodiment 8, it was possible to obtain the fastness of the image while suppressing cockling.

As shown in Comparative example 5, even in a case where the airflow volume in a case where non-coated paper 1 is dried is set smaller than that in Exemplary embodiment 5, it is possible to obtain the fastness (scratch resistance) of the image. However, the airflow volume in a case where non-coated paper 1 is dried is too small for the basis weight of coated paper 1, and therefore, the water content of non-coated paper 1 becomes 10 mass % or more. As a result of that, cockling becomes more likely to occur than in Exemplary embodiment 5.

As shown in Comparative example 6, even in a case where the airflow volume in a case where non-coated paper 2 is dried is set larger than that in Exemplary embodiment 6, it is possible to obtain the fastness (scratch resistance) of the image at a degree that does not bring about any problem in actual use. However, the airflow volume in a case where non-coated paper 2 is dried is too large for the basis weight of non-coated paper 2, and therefore, the water content of coated paper 2 is reduced compared to that in Exemplary embodiment 6. As a result of that, the fastness of the image is reduced compared to that in Exemplary embodiment 6.

As shown in Comparative example 7, even in a case where the undersurface heating temperature in a case where non-coated paper 1 is dried is set lower than that in Exemplary embodiment 7, it is possible to obtain the fastness of the image. However, the undersurface heating temperature in a case where non-coated paper 1 is dried is too low for the basis weight of non-coated paper 1, and therefore, the water content of non-coated paper 1 becomes 10 mass % or more. As a result of that, cockling becomes more likely to occur than in Exemplary embodiment 7.

As shown in Comparative example 8, even in a case where the undersurface heating temperature in a case where non-coated paper 2 is dried is set higher than that in Exemplary embodiment 8, it is possible to obtain the fastness of the image at a degree that does not bring any problem in actual use. However, the undersurface heating temperature in a case where non-coated paper 2 is dried is too low for the basis weight of non-coated paper 2, and therefore, the water content of non-coated paper 2 is reduced compared to that in Exemplary embodiment 8. As a result of that, the fastness of the image is reduced compared to that in Exemplary embodiment 8.

Further, as shown in [Table 1] in FIG. 5, it is preferable for the warm air temperature to be a constant value (in the example in Table 1 in FIG. 5, 80 °C) irrespective of the size of basis weight. The reason is that in a case where the state is switched from the state where a printing medium having a predetermined basis weight is printed to the state where a printing medium whose basis weight is different from that of the printing medium is printed, it is possible to reduce the time required for the switch. Of course, as long as it is possible to suppress the water content after the drying step is completed within the range not more than 10 mass % and not less than 2 mass %, it may also be possible to dry a printing medium while changing the warm air temperature.

As explained above, in a case where the basis weight of a printing medium is comparatively small, by setting the airflow volume in a case where air is blown or the temperature in a case of heating comparatively large or high, it is possible to make the water content of a printing medium after the drying step is completed not more than 10 mass % and not less than 2 mass %.

On the other hand, in a case where the basis weight of a printing medium is comparatively large, by setting the airflow volume in a case where air is blown or the temperature in a case of heating comparatively small or low, it is possible to make the water content of a printing medium after the drying step is completed not more than 10 mass % and not less than 2 mass %.

As above, by appropriately setting the airflow volume at the time of blowing air or the undersurface hating temperature or both of these in a case where a printing medium is dried in accordance with the size of basis weight of the printing medium, it is possible to obtain the fastness of an image while suppressing cockling. Consequently, according to the printing method of the present embodiment, it is possible to appropriately dry a printing medium.

Other Embodiments

In the example in FIG. 1, the heat source of the fixing unit is arranged outside the rotation axis and the fixing belt is heated, but the heat source may be arranged inside of the rotation axis. In this case, inside of the heating and pressure roller, for example, a halogen heater or the like is arranged. Further, the heat source of the fixing unit may be both outside the rotation axis and inside of the heating and pressure roller.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the printing method of the present invention, it is possible to appropriately dry a printing medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-074324, filed Apr. 28, 2023 which are hereby incorporated by reference wherein in its entirety.

What is claimed is:

1. A printing method comprising:

an ink application step of applying ink to a printing medium; and a drying step of drying the printing medium to which ink has been applied at the ink application step, wherein in a case where the printing medium is a first type, at the drying step, the printing medium is dried by using a first drying method so that a water content of the printing medium is included within a predetermined range, and in a case where the printing medium is a second type whose tendency to contain water is stronger than that of the first type, at the drying step, the printing medium is dried by using a second drying method whose drying effect is higher than that of the first drying method so that the water content of the printing medium is included within the predetermined range.

2. The printing method according to claim 1, wherein a basis weight of the printing medium of the first type is larger than that of the printing medium of the second type.

3. The printing method according to claim 1, wherein in a case where the printing medium is the first type, at the drying step, airflow volume of an air blowing mechanism is set to a first airflow volume, and in a case where the printing medium is the second type, at the drying step, the airflow volume of the air blowing mechanism is set to a second airflow volume larger than the first airflow volume.

4. The printing method according to claim 3, wherein the air blowing mechanism blows air to a surface of the printing medium to which ink has been applied.

5. The printing method according to claim 1, wherein in a case where the printing medium is the first type, at the drying step, a temperature of a heating mechanism is set to a first temperature, and in a case where the printing medium is the second type, at the drying step, the temperature of the heating mechanism is set to a second temperature higher than the first temperature.

6. The printing method according to claim 5, wherein the heating mechanism heats a surface facing in a direction opposite to a direction in which a surface of a printing medium to which ink has been applied.

7. The printing method according to claim 1, wherein the water content in the predetermined range is 2 mass % to 10 mass %.

8. The printing method according to claim 1, wherein at the drying step, the printing medium is maintained in a smooth posture by sucking a surface on an opposite side of a surface to which ink has been applied.

9. The printing method according to claim 1, wherein at the ink application step, a reaction liquid is further applied to the printing medium.

10. The printing method according to claim 9, wherein at the ink application step, a reaction liquid is applied before ink is applied.

11. The printing method according to claim 10, wherein at the ink application step, the printing medium is maintained in a smooth posture by sucking a surface on an opposite side of a surface to which ink has been applied.

12. The printing method according to claim 1, further comprising:

a fixing step of fixing ink to the printing medium dried at the drying step.

13. The printing method according to claim 12, wherein at the fixing step, a film is formed by heat and pressure being applied to the printing medium dried at the drying step and resin particles included in ink being softened.

14. The printing method according to claim 1, wherein colors of ink include at least one of yellow, magenta, cyan, and black.

15. A printing apparatus comprising:

an ink application unit capable of applying ink to a printing medium;

a drying unit capable of drying the printing medium to which ink has been applied by the ink application unit; and a setting unit configured to set a drying method of the drying unit in accordance with a type of printing medium, wherein in a case where the printing medium is a first type, the setting unit sets so that the drying unit performs a first drying method, and in a case where the printing medium is a second type whose tendency to contain water is stronger than that of the first type, the setting unit sets so that the drying unit performs a second drying method whose drying effect is higher than that of the first drying method.

16. The printing apparatus according to claim 15, wherein the setting unit sets the drying unit by referring to a table in which types of printing medium and setting contents of the drying unit are associated with each other in advance.

* * * * *